No. 747,359. PATENTED DEC. 22, 1903.
A. W. A. BARNARD & W. G. REID.
SECATEUR.
APPLICATION FILED SEPT. 23, 1902. RENEWED SEPT. 4, 1903.
NO MODEL.
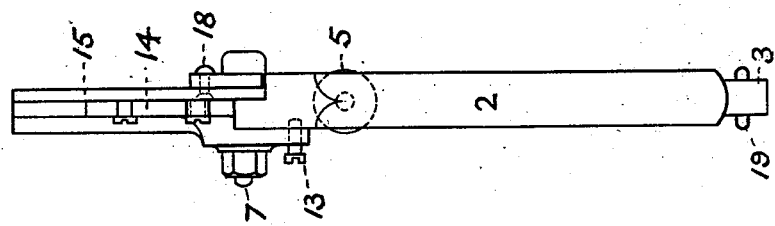
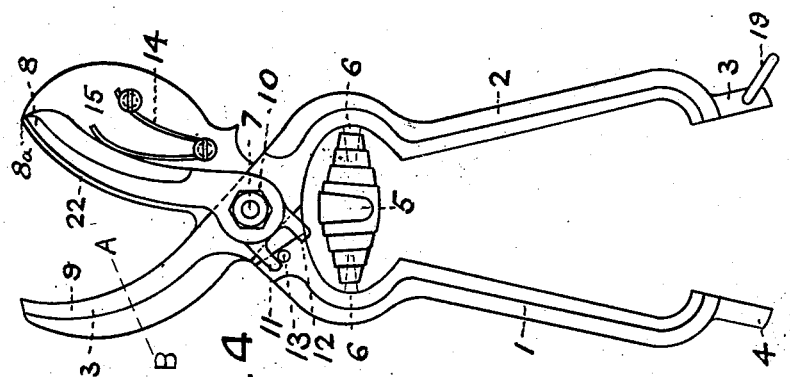
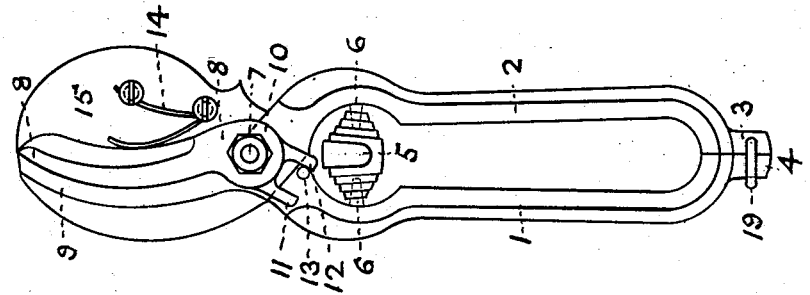
WITNESSES:
INVENTORS.
Alfred Walter Alexander Barnard
William George Reid
BY Richards &co
ATTORNEYS.

No. 747,359. Patented December 22, 1903.

UNITED STATES PATENT OFFICE.

ALFRED WALTER ALEXANDER BARNARD AND WILLIAM GEORGE REID, OF DUNEDIN, NEW ZEALAND.

SECATEUR.

SPECIFICATION forming part of Letters Patent No. 747,359, dated December 22, 1903.

Application filed September 23, 1902. Renewed September 4, 1903. Serial No. 172,026. (No model.)

*To all whom it may concern:*

Be it known that we, ALFRED WALTER ALEXANDER BARNARD, government service, and WILLIAM GEORGE REID, botanical gardener, both of Dunedin, New Zealand, have invented a certain new and Improved Secateur, of which the following is a specification.

This invention relates to improvements in secateurs or devices in the form of scissors or shears used for cutting flowers, slips of trees and bushes, pruning, and like purposes; and the objects of my improvements are to provide means whereby the article cut or severed may be held by the device after being severed.

The invention consists of the features, combination, and arrangement of parts that are hereinafter described and are more particularly pointed out in the claims.

In the accompanying drawings, Figure 1 is a side view of our improved secateur closed. Fig. 2 is a side view of our improved secateur open. Fig. 3 is an edge view of Fig. 1. Fig. 4 is a cross-section through A B, Fig. 2.

The same numbers of reference indicate the same or similar parts.

There is a handle 1, provided with blade 15, and a handle 2, provided with jaw 9, the whole secured together by pivot-bolt 7 and nut thereon. The extremity of one handle 2 is provided with a lug 3, to which a loop 19 is attached pivotally and adapted to pass over a similar lug 4 at the extremity of the other handle 1 when it is desired to hold the secateur closed. A spring 5, retained in position by the spikes 6 on the handles, keeps the handles, and consequently the jaws, of the secateur open when loop 19 is withdrawn off lug 4. The jaw 9 is an extension of the handle 2. It has a concave face to correspond with the curved edge of the blade 15 and is provided with a raised piece 23, a cross-section of which at A B, Fig. 2, is shown in Fig. 4. The blade 15 is secured to handle 1 by rivet 18, Fig. 3, bolt 7, and nut thereon.

The blade 15 of my improved secateur is curved more fully than the ordinary one at the outer end, as illustrated in Fig. 2, between the point marked 22 and the point marked 8ª, and the object of this curvature is to insure the gripping and cutting of an article. The jaw 8 lies and slides on the blade 15. Its face is curved similar to the cutting edge of the blade 15, and it is held nearly coincident therewith by means of the spring 14, secured to the blade 15, acting in conjunction with the pin 13. The object of having the jaw 8 nearly coincident with—that is, a short distance back from and parallel to the edge of—the blade is to insure that the blade cuts the article before the jaw touches it. If it were otherwise, a rapid stroke of the secateur with a subsequent pull might cause the secateur to slip off the article. The jaw 8 is also pivotally held at the part 10 by the bolt 7 and nut thereon, and it is provided with an extension forming lugs 11 and 12. These lugs travel backward and forward on the pin 13, secured on handle 1 between them, and thereby regulate the movement of the jaw 8, as follows: In Fig. 2, where the device is open, the lug 11 is against pin 13, and the jaw 8 is prevented from traveling farther forward than the position illustrated—namely, nearly coincident with the edge of the blade 15; but said jaw 8 is free to travel backward. When the device is being closed, the jaw 8 moves forward with the blade 15 until said jaw 8 meets the cut article, whereupon the jaw 8 retreats, compressing the spring 14 under the pressure of the cut article until lug 12 is arrested by pin 13, whereupon a firm grip of the cut article is attained between the jaw 8 and the raised piece 23 of the jaw 9, which is provided with the raised piece for this purpose. The greater the pressure of the handles together the firmer is the grip. In Fig. 1, when the handles are held tightly together, clamped by loop 19 over the lug 4, the spring 5 is compressed, the spring 14 is also compressed, the curved faces of the jaw 8 and jaw 9 are in contact with each other or with the article between them, and the edge of the blade 15 has passed them.

In Fig. 2 the device is illustrated ready for use, being kept open by the spring 5. The article to be cut is placed within the open jaws of the device. The jaw 9 is curved similar to the curve of the edge of the blade 15, so that when these are brought together by the operation of closing the handles the edge of the blade may make a drawing cut of the article, and, moreover, these curved surfaces enable the device to take a better grip of a larger article than straight surfaces, which would tend to slip off the article without cutting it with certainty. As soon as the edge of the blade 15 cuts the article by shearing past the edge of the jaw 9 and before the article is cut through the jaw 8 is met by the article, and being pressed by the spring 14 the jaw 8 presses the article against the jaw 9 and the article is held after being cut. The pressure on the handles is continued until the lug 12 meets the pin 13, as before described, insuring a firm grip of the article, and the latter may be held without pressing the handles by placing the loop 19 over lug 4. The article may be released by releasing the handles, whereupon the spring 5 will separate them, thereby opening the blade and jaws.

Having now described our invention, what we claim as new, and desire to secure by Letters Patent, is—

In a secateur in combination a convex-edged blade a spring-actuated convex-faced jaw slidable on said blade and secured pivotally to the pivot-pin of the secateur, a two-lugged extension to said jaw below said pivot-pin, a pin between said lugs on the blade-carrying handle and a concave-faced jaw provided with a concave-faced raised piece forming an extension of the other handle of said secateur, substantially as and for the purposes set forth.

In witness whereof we have hereunto set our hands in presence of two witnesses.

ALFRED WALTER ALEXANDER BARNARD.
WILLIAM GEORGE REID.

Witnesses:
A. J. PARK,
J. R. PARK.